United States Patent [19]

Lemirande

[11] 4,394,607
[45] Jul. 19, 1983

[54] CONTROL SYSTEMS FOR GATES AND THE LIKE INCLUDING A MOTOR OVERLOAD MONITORING CIRCUIT

[75] Inventor: Rodger P. Lemirande, Riverview, Mich.

[73] Assignee: Stanley Automatic Openers, Detroit, Mich.

[21] Appl. No.: 261,846

[22] Filed: May 8, 1981

[51] Int. Cl.³ .............................................. H02P 1/16
[52] U.S. Cl. .................................. 318/453; 318/471; 318/476; 318/469
[58] Field of Search ....................... 361/23, 24, 25, 30, 361/31, 33; 318/453, 471, 474, 476, 469, 468, 467, 449, 450, 265–267

[56] References Cited

U.S. PATENT DOCUMENTS

| | | | |
|---|---|---|---|
| 3,254,289 | 5/1966 | Hartman | 318/476 |
| 3,513,374 | 5/1970 | Koment | 318/476 X |
| 3,851,216 | 11/1974 | Clarke et al. | 361/31 |
| 3,868,554 | 2/1975 | Konrad | 361/31 X |
| 3,891,909 | 6/1975 | Newson | 318/476 X |
| 3,912,976 | 10/1975 | Sons et al. | 361/31 |
| 4,177,492 | 12/1979 | Noddings et al. | 361/31 |
| 4,217,616 | 8/1980 | Jessup | 361/31 |
| 4,325,095 | 4/1982 | Hart | 361/23 |

Primary Examiner—Ulysses Weldon
Attorney, Agent, or Firm—Krass, Young & Schivley

[57] ABSTRACT

A control system for operating a bidirectional gate driven by a reversible electric motor includes an overload protection circuit to prevent motor current overload produced by gate obstructions and the like. The system includes control switches for operating gate opening and gate closing circuits which respectively energize the motor for rotation in opposite directions. The safety circuit includes a motor current sensing device and a first comparator which compares the level of sensed motor current with a temperature adjusted, selectable reference value and delivers a motor disabling signal to the opening and closing circuits if the sensed value exceeds the reference level. The safety circuit also includes a second comparator which compares the sensed current level with another reference value to produce the disabling signal in the event that the selected reference value of the first comparator is incorrect.

28 Claims, 5 Drawing Figures

CONTROL SYSTEMS FOR GATES AND THE LIKE INCLUDING A MOTOR OVERLOAD MONITORING CIRCUIT

TECHNICAL FIELD

This invention generally relates to control systems for motor operated gates and the like, and deals more particularly with a safety circuit for stopping the gate in the event of meeting an obstruction.

BACKGROUND ART

The demand for automatic door and gate openers has increased rapidly during recent years for a number of reasons including the high cost of labor, convenience and security. Depending upon the particular installation, anyone of several different types of gates or doors may be employed, such as swinging single gates, opposed swinging gates, vertical roll-up doors, and horizontally traveling, track gates.

Control systems employed for operating these gates and doors normally include one or more sensors which automatically open and close the gate or door in response to the approach of a person or vehicle.

Gates and doors of the type described above are typically operated by a reversible electric motor, which in turn is operated by the control system. Some control systems may employ a plurality of manually actuable switches to allow the user to either open, close or stop the door or gate by actuating a single switch. Other systems employ a single manually actuatable switch which may be sequentially operated by the user to effect opening, closing or stopping of the gate or door. In some cases, door or gate operation is automatically effected by one or more remotely located switches which are automatically activated by a vehicle or person approaching or leaving the gate.

Various types of obstructions are encountered from time to time which may prevent the gate from opening or closing. When an obstruction is encountered by a gate, the load on the gate driving motor is substantially increased, thereby substantially increasing the level of electrical current flowing through the motor. It is normally desirable to interrupt movement of the gate/door when it encounters an obstruction, consequently, means must be provided for sensing the overcurrent condition and for de-energizing the driving motor shortly after the obstruction is encountered. Previous attempts at obstruction sensing have been mechanical in nature; prior protective devices consisted of mechanical clutches connecting the motor to the gate which released the connection when the mechanical load on the motor exceeded a prescribed value. These mechanical clutches are not only rather costly to manufacture, but also add to the overall bulk of the gate opener and are also subject to frequent mechanical failure as well as the need for periodic maintenance. Moreover, failure of these clutches to operate properly when an obstruction is encountered often results in permanent electrical damage to the motor.

Thus, there is a need in the art for a gate control system having electronic obstruction sensing which avoids each of the deficiencies of the prior art system discussed above.

DISCLOSURE OF THE INVENTION

A control system for operating a bidirectional gate or door driven by a reversible electric motor includes a load monitoring circuit which stops the motor during current overload produced by gate obstructions or the like. The system includes a plurality of manually actuable control switches for operating a gate opening and gate closing circuit which respectively energize the motor for rotation in opposite directions. The monitoring circuit includes a current sensing resistor for sensing the level of current flowing through the motor and a first comparator which compares the sensed level of current with an adjustable reference value. The first comparator delivers a motor disabling signal to both the opening and closing circuits if the sensed value exceeds the reference level. A thermistor is employed in combination with the first comparator in order to automatically adjust the reference voltage of the comparator in response to changes in the ambient temperature. A second comparator in the safety circuit compares the motor current with another reference value in order to produce the disabling signal in the event that either the selected reference value for the first comparator is incorrect, or the first comparator malfunctions.

BRIEF DESCRIPTION OF THE DRAWINGS

In the drawings, which form an integral part of the specification and are to be read in conjunction therewith, and in which like components are designated by identical reference numerals in the various views.

BEST MODE FOR CARRYING OUT THE INVENTION

Figure 1:
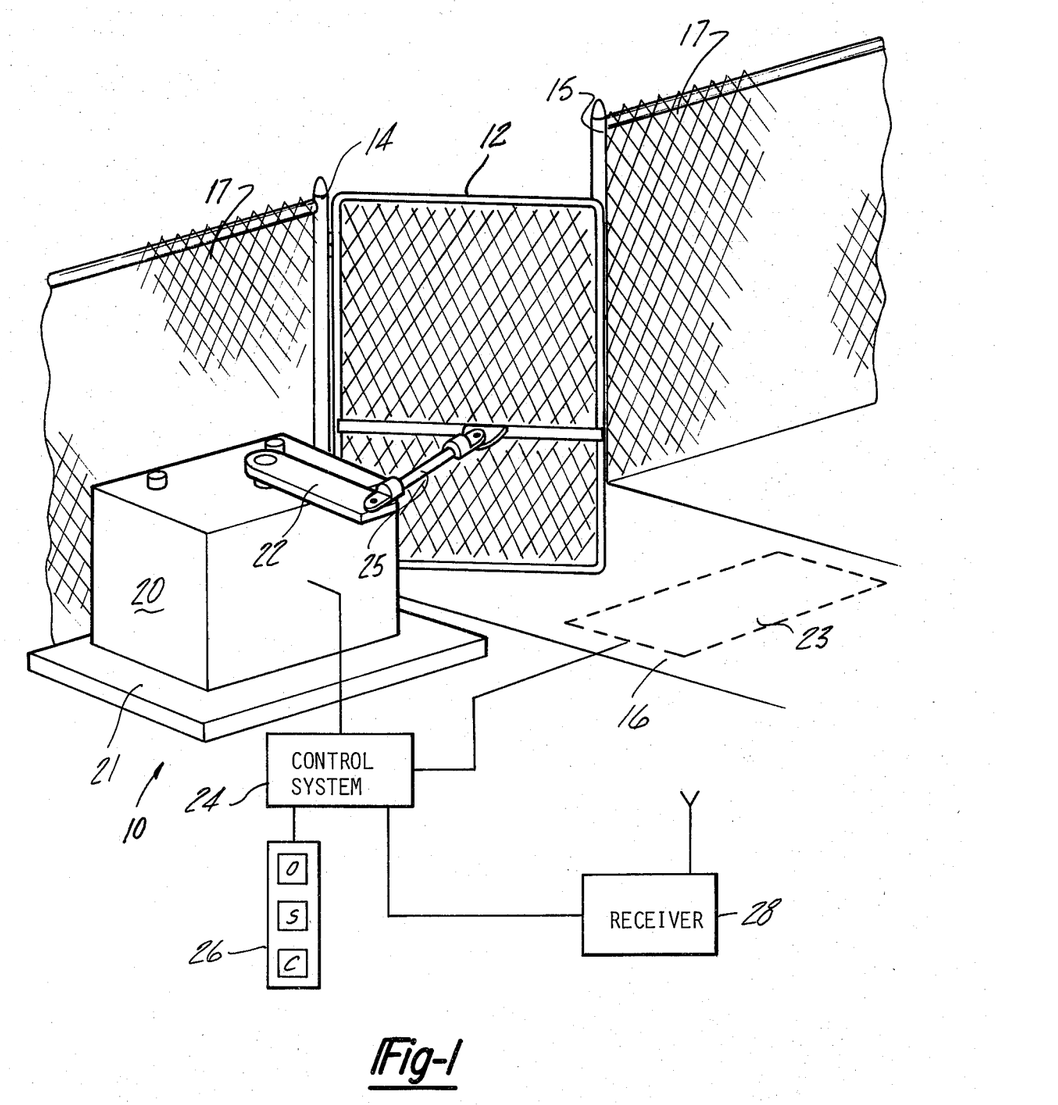
FIG. 1 is a combined block and perspective view of the gate control system including a load monitoring circuit which forms the preferred embodiment of the present invention.
Figure 2:
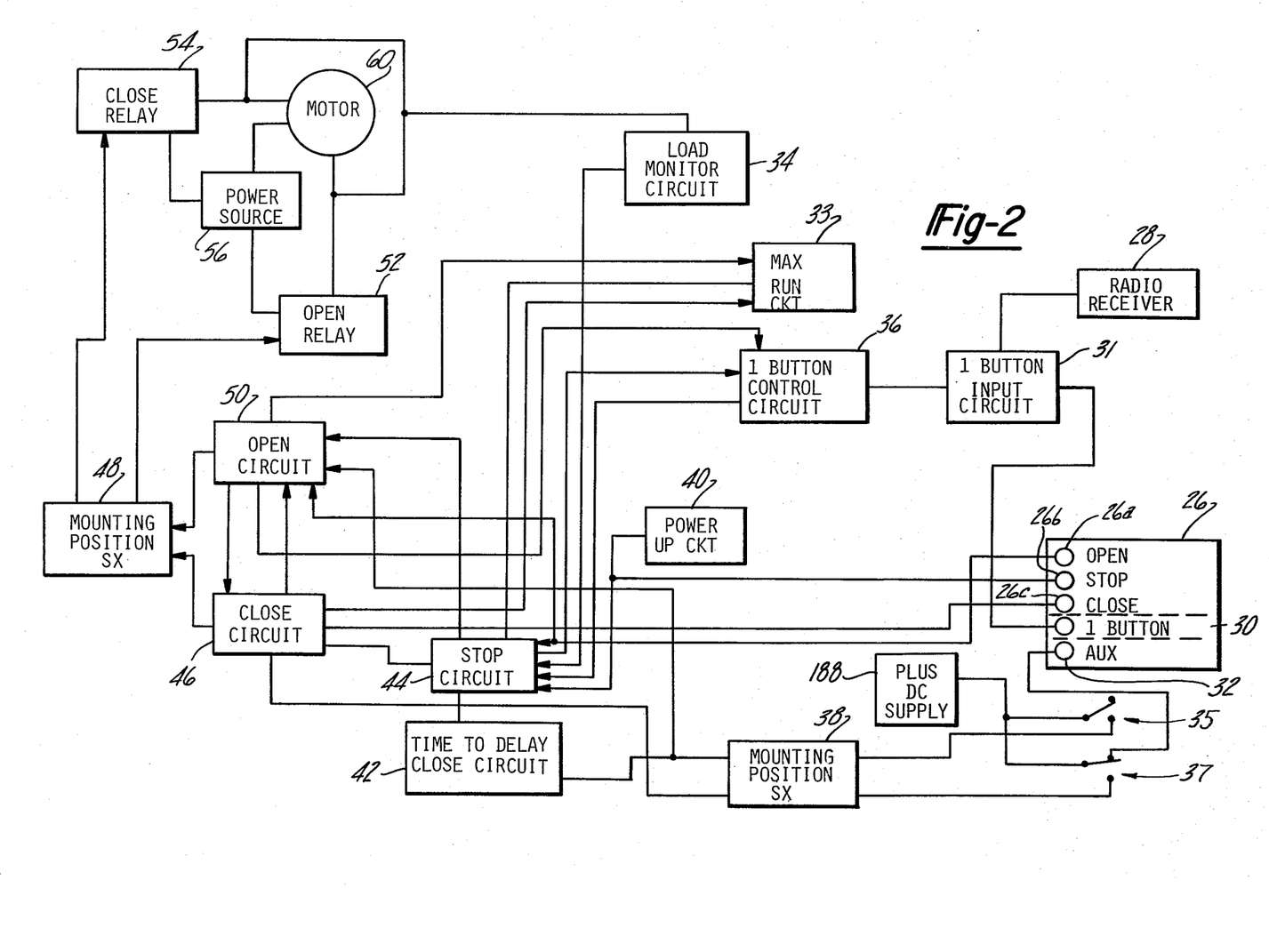
FIG. 2 is a block diagram of the control system shown in FIG. 1.

Referring first to FIGS. 1 and 2, the present invention is broadly concerned with a gate control system, indicated at 10, for selectively opening and closing a swingable gate 12 which is pivotally mounted for horizontal swinging movement about an upstanding post 14 positioned along one side of a pathway 16. The gate 12 forms a closure for an opening in a fence 17 or the like.

The gate control system 10 includes a gate operator 20 which houses a motor 60 coupled through gearing (not shown) to a swingable drive crank 22. Crank 22 is pivotally connected to one end of a link 25, the other end of link 25 being pivotally connected to gate 12. The operator 20 is mounted on a supporting pad 21 which may consist of concrete. The operator 20 may be readily adapted to operate either left or righthand opening gates by merely repositioning the position of the drive crank 22.

The operator 20 is connected to an electrical control system 24, which may be housed internally of the operator 20, for controlling the operating functions of the operator 20. A manually operable switch set 26 is connected with the control system 24 and includes three manually operable switches to allow the user to open, stop or close the gate 12. A radio receiver 28 is also connected with the control system 24 in order to receive command signals from a transmitter (not shown) which provides a function similar to switches 26. One or more pressure, metal or optical sensing devices 23 may be employed adjacent the pathway 16 for detecting pedestrians or vehicles approaching or leaving the gate opening.

An open limit switch 35 and a close limit switch 37 are mounted internally of the operator 20 and are respectively actuated when the gate 12 swings to its open or closed positions.

Assuming for the moment that the switch set 26 is employed, activation of the open switch 26a delivers control signals to a stop circuit 44 and open circuit 50. Stop circuit 44 is responsive to deliver a disabling signal to a close circuit 46. Assuming for the moment that the gate 12 is in the process of closing, close circuit 46 delivers a disabling signal through switch 48 to the closed relay 54. Closed relay 54 is responsive to disconnect the motor 60 from the power source 56, thereby de-energizing the motor 60 and stopping movement of the gate 12. The open circuit 50 delivers an enabling signal through switch 48 to an open relay 52, which in turn couples another coil of the motor 60 with the power source 56 thereby energizing the motor 60 to swing the gate 12 to its open position. In the event that the gate 12 is in the closed position when the open switch 26 is actuated, the disabling signal output by the closed circuit 46 has no effect on motor 60.

In the event that the gate 12 is in the process of either opening or closing and it is desired to stop the gate 12 during its swing, the stop switch 26b may be depressed. Actuation of stop switch 26b delivers a signal to the stop circuit 44. Stop circuit 44 is responsive to deliver control signals to both the open circuit 50 and close circuit 46, which in turn generate disabling signals. These disabling signals are delivered through switch 48 to open and closed relays 52 and 54, respectively, thereby disabling the motor 60.

The operation of the close switch 26c is essentially inverse to that of the open switch 26a.

A discretely wired one-button switch 30, or a one-button switch transmitter (not shown) may be used in combination with the radio receiver 28 for performing the functions of the switch set 26. For example, a first actuation of the one-button switch 30 delivers a control signal to a one-button input circuit 31, which in turn actuates the one-button control circuit 36. Control circuit 36 sequentially delivers control signals to the stop circuit 44 and open and close circuits 50 and 46, respectively, in order to operate the gate 12 in a manner similar to that obtained with the switch set 26.

A pair of later-discussed mounting switches 38 and 48 are employed to reverse various connections in the circuit in order to allow the operator 20 to be mounted in either the lefthand or righthand position.

The auxiliary switch 32 may be employed in combination with the sensing device 23 in order to stop the gate 12, if it is closing and cause it to open. If the gate 12 is stopped in midtravel, the auxiliary switch 32 will cause the gate 12 to open.

The open and close limit switches 35 and 37, respectively, are actuated when the gate swings to its open or closed position as previously discussed. Limit switches 35 and 37 deliver control signals to the stop circuit 44, which in turn conditions the open and closed circuits 50 and 46, respectively, in order to de-energize the motor 60.

A maximum run circuit 33 is employed for disabling the motor 60 after a prescribed time interval has elapsed following the receipt of a control signal which causes the gate 12 to open or close. This feature prevents damage to operator components such as a clutch where an obstruction prevents full swinging movement of the gate 12 to either its closed or open position. The open and close circuits 50 and 46 output signals to the maximum run circuit 33; when circuit 33 has timed out, a stop signal is delivered from circuit 33 to the stop circuit 44, which in turn conditions circuits 46 and 50 to de-energize the motor 60.

Load monitoring circuit 34 is provided for sensing the magnitude of current flow delivered from the power source 56 through the coils of the motor 60. When the sensed level of current flow exceeds a preselected value, the load monitoring circuit 34 is operative to deliver signals to the stop circuit 44, which in turn disconnects the motor 60 from the power source 56. Overcurrent conditions may be produced by obstructions to the gate 12 or similar conditions which overload the motor 60. As will become apparent hereinafter, the current level at which the load monitoring circuit 34 is activated is automatically adjusted to compensate for variations produced by changes in ambient temperature.

Figure 3:
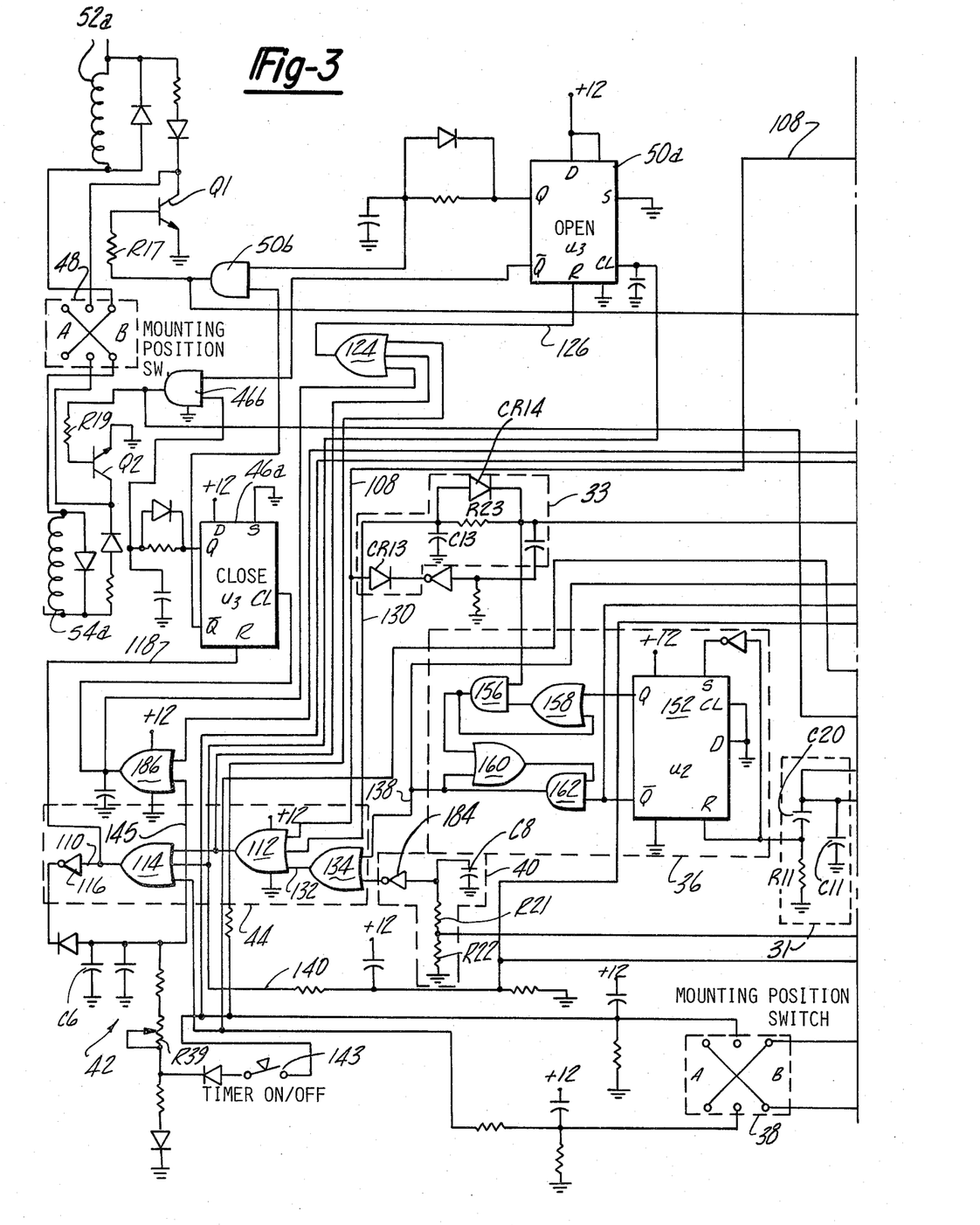
FIGS. 3–5, taken together, form a detailed schematic diagram of the control system depicted in FIGS. 1 and 2.
Figure 4:
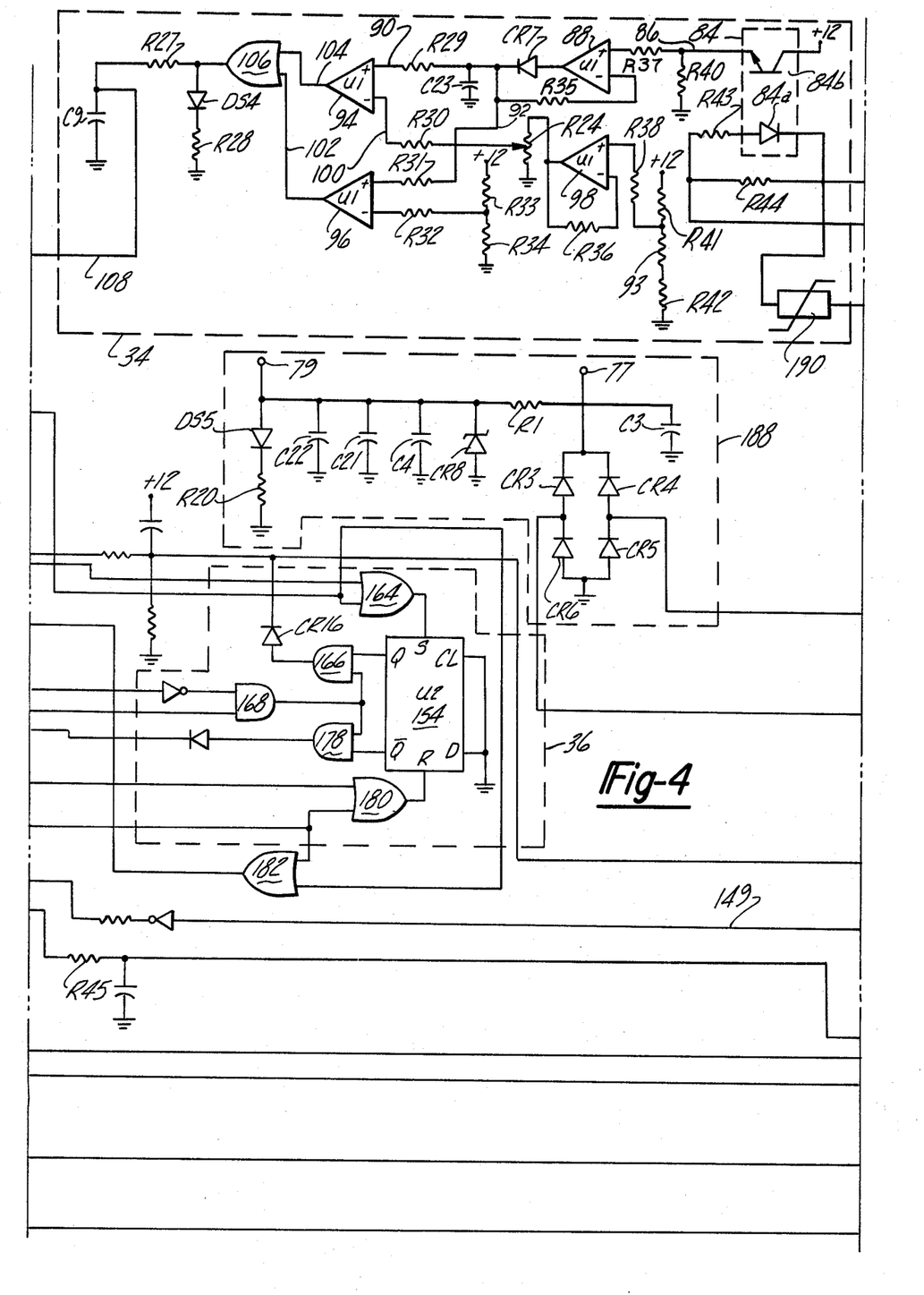
Figure 5:
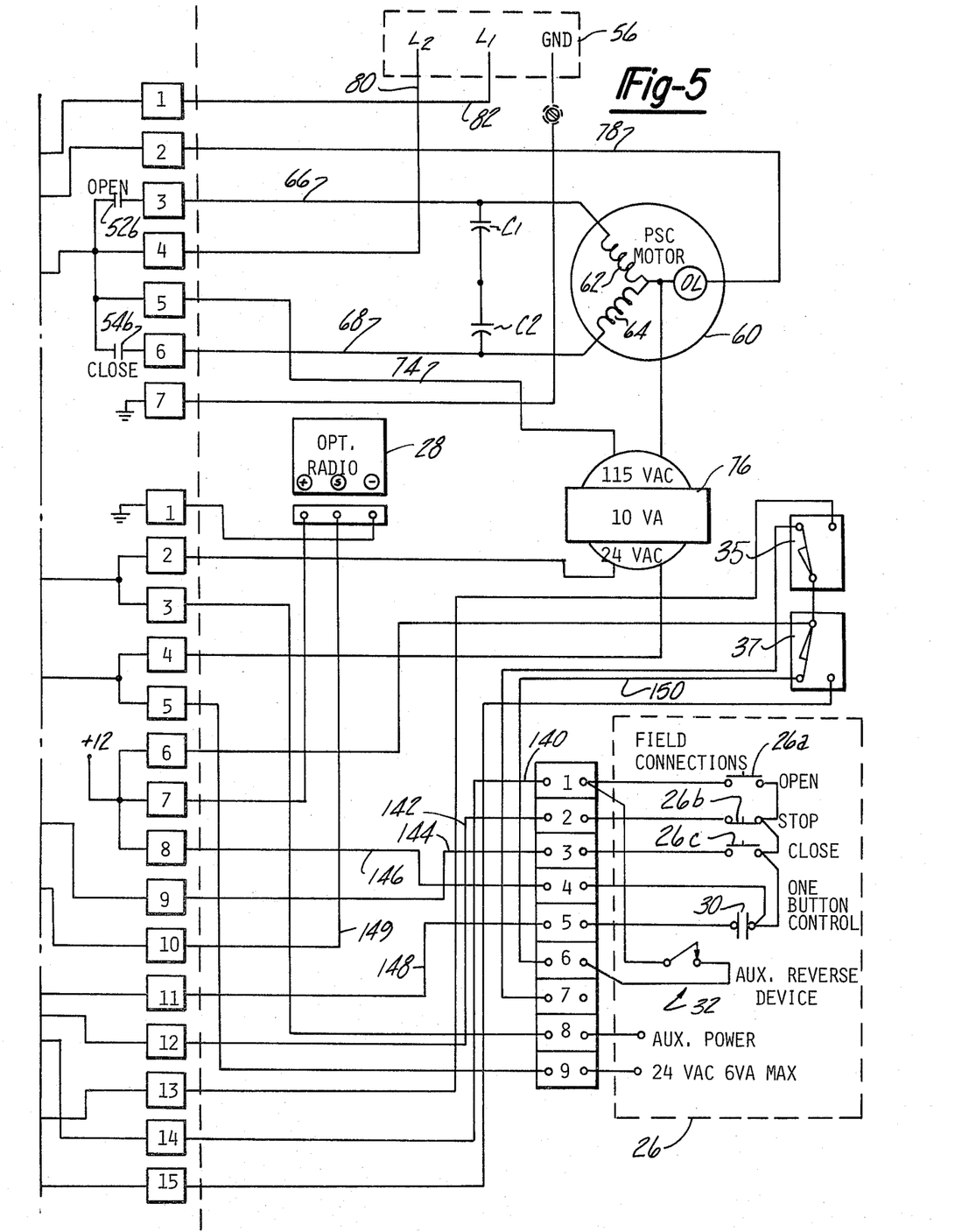

Turning attention now particularly to FIGS. 3-5, a suitable AC power source 56 has a pair of output supply lines 80 and 82 for supplying electrical power to the motor 60 as well as the related control circuit. Line 80 is coupled through relay contacts 52b and 54b, and corresponding lines 66 and 68 to coils 62 and 64 of motor 60. Line 82 is connected through sensing resistor R44 and line 78 to the common terminal of motor 60. When relay contact 52b is closed, current flows through coil 62, causing motor 60 to rotate in one direction which opens the gate 12. Closure of relay contact 54b results in the energization of the coil 64, thereby causing the motor 60 to rotate in the opposite direction to close the gate 12.

A step-down transformer 76 has the primary thereof coupled across supply lines 80 and 82, while the secondary thereof is connected to the input of a power supply generally indicated within the broken lines 188. Power supply 188 supplies electrical power to the control circuit and broadly comprises a rectification bridge consisting of diodes CR3-CR6 which provides 24-volt unregulated power to terminal 77. A series dropping resistor R1, in combination with capacitors C4, C21 and C22, as well as zener diode CR8, provides a 12-volt regulated power supply at terminal 12. A light emitting diode DS5 provides visual indication when the power supply 188 is on.

A metal oxide resistor (varistor) 190 is connected in parallel with supply line 80 to prevent damage to either the control circuit or the motor 60 as a result of high level transient signals in the supply line produced by lightening or other causes.

Sensing resistor R44 is connected in series with a current reducing resistor R43 and the light emitting diode portion 84a of an optical coupler 84. The LED portion 84a of the optical coupler 84 operates the transistor portion 84b thereof to produce a current flow in line 86 proportionate to the current flow through resistor R44, which is in turn proportionate to the current flow through the motor 60. Optical coupler 84 serves to isolate the safety circuit 34 from the power source 56 and motor 60. Line 86 is coupled through resistor R37 to the positive input of operational amplifier 88, the negative input thereto being connected in feedback to its output through resistor R35 and diode CR7. Op-amp 88 is thus connected in an ideal diode configuration such that the voltage across resistor R40 is equivalent to the DC voltage level across capacitor C23, which is connected between diodes CR7 and ground.

The voltage across capacitor C23 is delivered to the positive input of op-amp 94 and is compared to a reference voltage value established by variable resistor R24, and resistor R30 which are connected in series by line 100 to the negative input of op-amp 94. The resistance of resistor R24 may be manually varied as desired. Additionally, the voltage on line 100 is adjusted in accordance with the ambient temperature by a temperature responsive circuit which comprises op-amp 98, resistors R36, R38, R41 and R42, as well as a thermistor 93. Thermistor 93 is coupled between the positive input of op-amp 98 and ground. Similarly, a regulated DC voltage source is connected in parallel with the thermistor 93 and to the positive input of op-amp 98 through resistors R38 and R41. Thus, it may be appreciated that the voltage across resistor R24 is determined by the output of op-amp 98 and varies in accordance with the resistance of thermistor 93, which in turn is proportionate to the ambient temperature.

Comparator 94 compares the voltage present on line 90 with that of the reference value 100 and produces an output on line 104 when the measured value (which is proportional to the level of current flowing through motor 60) exceeds the reference value on line 100. The output of op-amp 94 is delivered to one input of OR gate 106 whose output is delivered to a light emitting diode DS4 which provides a visual indication of the overcurrent condition, as well as to output line 108 via resistor R27.

The output of op-amp 88 is also delivered via line 92 through resistor R31 to the positive input of op-amp 96. The negative input of op-amp 96 is connected through resistor R32 to a reference voltage source established by a voltage divider comprising resistors R33 and R34. Thus, op-amp 96 defines a second comparator for comparing the magnitude of a signal which is proportional to the current flowing through the motor 60 with a reference value to determine whether a motor overcurrent condition exists. The output of op-amp 96 is delivered to a second input of OR gate 106; consequently, it can be appreciated that a control signal is delivered on line 108 when either input to OR gate 106 is high.

The comparator network consisting of op-amps 94 and 98 monitor the current flowing through the motor 60 and produce an output control signal, whose function will be discussed later in more detail, only when such current flow exceeds a preselected value. The preselected value may be set by adjusting the resistance of resistor R24; this permits the safety circuit 34 to be employed in various applications with different types of motors 60. For example, in environments where snowfall may present some minor resistance to gate 12, resistor R24 may be adjusted such that motor 60 is deenergized by the control system only when a more substantial obstruction blocks the swing of the gate 12. In other applications, as where livestock or children may become wedged between the gate and fence during closing of the gate, resistor R24 may be set such that motor 60 is deenergized when only minor current overload is experienced by the motor 60. Additionally, as previously discussed, the thermistor 93 automatically adjusts the reference value present on line 100 in accordance with temperature changes so that it is not necessary to adjust resistor R24 in accordance with seasonal temperature variations.

In the event that the first comparator system which includes op-amps 94 and 88 malfunctions or the reference values thereof are improperly set, the second comparator system which comprises op-amp 96 provides assurance that the necessary control signal will be delivered on line 108 to deenergize the motor 60. The level of current flowing through motor 60 which will produce an output from op-amp 96 will normally be higher than that required to produce an output from op-amp 94.

Resistor R27 and capacitor C9 form an RC time circuit which must be charged by the output of OR gate 106 before the control signal is delivered on line 108; this prevents the control signal being produced on initial start-up of motor 60 when temporary current surges may be experienced.

The control signal on line 108 is delivered to OR gate 112 which forms a portion of the stop circuit 44. OR gate 112 also receives inputs from an output of the maximum run circuit 33, the one-button control circuit 36 and the power-up circuit 40. The output of OR gate 112 is delivered via line 122 through OR gate 124 to the reset input of flip-flop 50a; the output of OR gate 112 is also delivered through OR gate 114 to the reset input of flip-flop 46a, as well as to the input of inverter 116.

The Q output of flip-flop 46a and the $\overline{Q}$ output of flip-flop 50a form the inputs to an AND gate 46b. Similarly, the $\overline{Q}$ output of flip-flop 50a and the Q output of flip-flop 46a form the inputs to AND gate 50b. AND gates 46b and 50b respectively form a portion of the close circuit 46 and open circuit 50. The outputs of AND gates 46b and 50b are delivered through the mounting position switch 48 through resistors R19 and R17 to the bases of transistors Q2 and Q1, respectively. Assuming for the moment that the mounting position switch 48 is connected such that the output of AND gate 50b is delivered to the base of transistor Q1, a high output of AND gate 50b turns on transistor Q1 which energizes relay coil 52a. Energization of relay coil 52a in turn closes contacts 52b, thereby energizing coil 62 of motor 60. If, however, the $\overline{Q}$ output of flip-flop 50a as well as the Q output of flip-flop 46a are high, the output of AND gate 46b is high and the output of AND gate 50b is low; accordingly, the high output signal from AND gate 46b turns on transistor Q2 which energizes relay coil 54a. Energization of relay coil 54a closes relay contacts 54b to energize coil 64 of motor 60.

When a high signal is present on line 108 from the safety circuit 34, each of the flip-flops 46a and 50a are reset and the outputs of AND gates 46b and 50b go low, thereby deenergizing both coils 62 and 64 of motor 60.

Flip-flops 46a and 50a may also be reset to deenergize motor 60 by depressing the stop button 26b or the one-button switch 30. For example, activation of the stop button 26 results in the delivery of the signal on line 142 to the power-up circuit 40 which comprises a voltage divider R21 and R22, as well as a capacitor C8 and inverter 184. The power-up circuit 40 delivers a signal through OR gates 112 and 134 to the reset inputs of flip-flops 46a and 50a. Alternatively, activation of the one-button switch 30 produces a signal which is delivered on line 148 to the one-button input circuit 31. A comparable signal may be produced by the radio receiver 28 which is delivered on line 149 to the one-button input circuit 31. Circuit 31 is responsive to activate the one-button control circuit 36, which includes flip-flops 152 and 154, as well as logic gates 156–168 and gates 178 and 180. Control circuit 36 is responsive to signals produced by the input circuit 31 to deliver signals to the stop circuit 44, which in turn resets flip-flops 46a and 50a.

Successive actuation of the one-button switch 30 also causes control circuit 36 to output signals on line 140 which are delivered to the clock inputs of flip-flops 46a and 50a. Thus, it can be appreciated that successive clocking flip-flops 46a and 50a alternately energize the relay coils 52a and 54a thereby alternately energizing the motor coils 62 and 64 for respectively opening and closing the gate 12.

The outputs of AND gates 46b and 50b form two inputs to the maximum run circuit 33, and more particularly to OR gate 182. The maximum run circuit 33 also includes a pair of diodes CR13 and CR14 and an RC time circuit consisting of resistor R23 and capacitor C13. The maximum run circuit 33 is therefore energized during the time interval that the gate 12 is either opening or closing. During the period that the maximum run circuit 33 is energized, its output on line 130 is low. When, however, the maximum run circuit 33 times out, a high signal is delivered on line 130 which is transmitted to the reset inputs of flip-flops 46a and 50a, thereby resetting the latter and deenergizing the motor. This feature is important, for example, where a clutch mechanism coupling the output of the motor 60 to the gate 12 is misadjusted or defective, in which case the limit switches 34 and 36 may not be activated.

Operation of the close button 26c produces a signal on line 144 which is delivered through OR gate 186 to the clock input of flip-flop 46a; this clock signal reverses the output of AND gates 46b and 50b in a manner which energizes relay coil 54a to reverse the direction of motor 60, thereby closing the gate 12. The signal on line 144 may also be produced by the one-button control circuit 36 and is derived from the output of AND gate 166.

Finally, flip-flop 46a may also be clocked by the time-to-delay close circuit 42 which comprises an RC time network consisting of capacitor C6 and variable resistor R39. Circuit 42 is coupled through a manually operable switch 143 to the limit switches 34 and 36. Assuming that the switch 143 is in a closed position, closure of the open limit switch 34 produced by opening of the gate connects circuit 42 with a voltage source which commences charging capacitor C6; when the RC network of circuit 42 times out, a high signal is delivered on line 145 through OR gate 186 to clock the flip-flop 46a, thereby causing the gate 12 to close. The time interval during which the gate remains open is determined by the setting of resistor R39.

From the foregoing, it is apparent that the gate control system described above provides a motor overload monitoring circuit which not only accomplishes the objects of the invention but does so in a particularly effective and reliable manner. It is recognized, of course, that those skilled in the art may make various modifications or additions to the preferred embodiment chosen to illustrate the invention without departing from the scope and spirit of the present contribution to the art. It is further recognized that the motor overload safety circuit of the present invention may be used with motors employed in various applications other than gate operators. Accordingly, it is to be understood that the protection sought and to be afforded hereby should be deemed to extend to the subject matter claimed and all equivalents thereof fairly within the scope of the invention.

What is claimed is:

1. Apparatus for controlling the current delivered through an electrical motor, comprising:
   means for producing a measured level of voltage proportionate to the magnitude of current flowing through said motor;
   means for generating a first reference level of voltage;
   means coupled with said producing means and said generating means for comparing the magnitude of said first reference level of voltage with said measured level of voltage and for producing a first output signal when said measured level exceeds said first reference level;
   means for generating a second reference level of voltage;
   means for comparing the magnitude of said second reference level of voltage with said measured level of voltage and for producing a second output signal when said measured level exceeds said second reference level; and,
   means responsive to either of said first and second output signals for interrupting delivery of electrical current to said motor.

2. The apparatus of claim 1, wherein said producing means includes a resistor adapted to be coupled between a source of electrical power and said motor.

3. The apparatus of claim 1, wherein said producing means includes an electro-optical coupling device adapted to be coupled between a source of electrical power and said motor.

4. The apparatus of claim 1, wherein said means for generating said first reference level includes means for manually adjusting said first reference level of voltage.

5. The apparatus of claim 4, wherein said means for manually adjusting includes a manually variable resistance and said means for generating said first reference level further includes a comparator having a first input adapted to be coupled with a source of voltage and a second input adapted to be coupled with said means for manually adjusting.

6. The apparatus of claim 3, wherein said producing means includes a comparator having an input coupled with said electro-optical coupling device and an output coupled with first comparing means.

7. The apparatus of claim 6, including means for automatically adjusting said first reference level of voltage in response to changes in the ambient temperature, said means for automatically adjusting including a thermistor.

8. The apparatus of claim 1, including means coupled with each of said comparing means for gating said first and second output signals.

9. The apparatus of claim 8, wherein said gating means includes a OR gate coupled between said interrupting means and said first and second comparing means.

10. The apparatus of claim 1, including means responsive to either of said first and second output signals for providing an indication that said measured level has exceeded one of said first and second reference levels.

11. The apparatus of claim 1, wherein said interrupting means includes at least one bistable circuit element.

12. The apparatus of claim 1, including a varistor element adapted to be coupled between said motor and a source of electrical power.

13. The apparatus of claim 1, including means for inhibiting the delivery of said first output signal to said interrupting means for a preselected time period.

14. The apparatus of claim 13, wherein said inhibiting means includes a capacitor.

15. A control system for use with a bidirectional gate driven by a reversible electric motor, comprising:
selectively operable switch means for producing control signals to operate said gate;
means responsive to said control signals for selectively energizing said motor; and,
means for disabling said energizing means when the level of electrical current flowing through said motor exceeds a prescribed level, whereby to prevent current overload of said motor, said disabling means including
(1) means for producing a measured level of voltage proportionate to the magnitude of current flowing through said motor,
(2) means for generating a first reference level of voltage, said generating means including a first comparator having a pair of inputs, said producing means including a second comparator having an output,
(3) first means coupled with said producing means and said generating means for comparing the magnitude of said first reference level of voltage with said measured level of voltage and for producing a first output signal when said measured level exceeds said first reference level, and,
means responsive to said first output signal for interrupting the delivery of electrical current to said motor.

16. The system of claim 15, wherein said disabling means includes temperature responsive means connected with said generating means for automatically adjusting said first reference level of voltage in response to changes in the ambient temperature.

17. The system of claim 15, wherein said producing means includes a resistor adapted to be coupled between a source of electrical power and said motor.

18. The system of claim 15, wherein said producing means includes an electro-optical coupling device adapted to be coupled between a source of electrical power and said motor.

19. The system of claim 15, wherein said generating means includes means for manually adjusting said first reference level of voltage.

20. The system of claim 19, wherein said means for manually adjusting includes a manually variable resistance.

21. The system of claim 15, including temperature responsive means connected with said generating means for automatically adjusting said first reference level of voltage in response to changes in the ambient temperature, said means for automatically adjusting including a thermistor.

22. The system of claim 15 including:
means for generating a second reference level of voltage; and,
means coupled with said producing means and said means for generating a second reference level for comparing the magnitude of said second reference level of voltage with said measured level of voltage and for producing a second output signal when said measured level exceeds said second reference level.

23. The system of claim 22, including means coupled with said first and second comparing means for gating said first and second output signals.

24. The system of claim 23, wherein said gating means includes an OR gate coupled between said interrupting means and said first and second comparing means.

25. The system of claim 15, including means for inhibiting the delivery of said first output signal to said interrupting means for a preselected time period.

26. The system of claim 15, wherein said energizing means includes:
a gate opening circuit having an output connected to said motor;
a gate closing circuit having an output connected to said motor; and,
circuit means coupled between said disabling means and said opening and closing circuits for controlling said gate opening and gate closing circuits.

27. The system of claim 26, wherein said opening and closing circuits each include a bistable circuit element having a reset input under control of said disabling means.

28. The system of claim 27, wherein said opening and closing circuits each include an electrical switch adapted to couple said motor with a source of electrical power and controlled by the corresponding bistable circuit element.

* * * * *